Oct. 13, 1931.  A. D'HALLOY  1,826,777
LOCK NUT
Filed Jan. 9, 1928
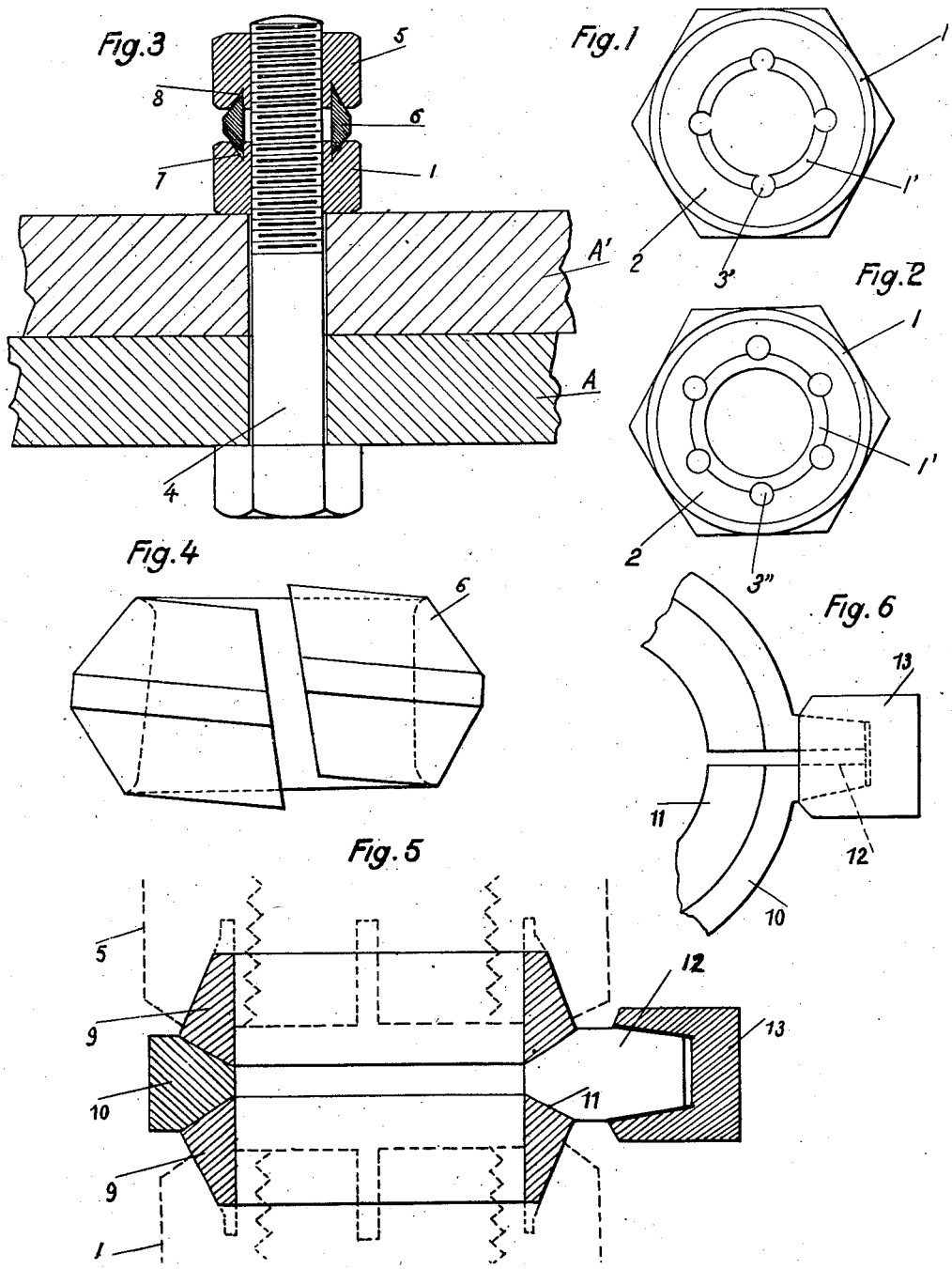

Patented Oct. 13, 1931

1,826,777

UNITED STATES PATENT OFFICE

AUDOIN D'HALLOY, OF PARIS, FRANCE, ASSIGNOR TO INTERNATIONAL SAFETY LOCK NUT CORPORATION, OF NEW YORK, N. Y., A CORPORATION OF DELAWARE

LOCK NUT

Application filed January 9, 1928, Serial No. 245,531, and in France October 14, 1927.

The subjects of the present invention are improvements to the lock nut device described in the applicant's application for patent, Serial Number 211,236 filed the 6th day of August, 1927.

The applicant has experienced that the radial slits formed upon the body of the nut so as to give elasticity to a part of its threading, could as well be of varied forms as be replaced by bored holes of any section, circular or other suitable shape, in sufficient number and of sufficient size to secure the elasticity of the part of the nut existing between the groove and the hole in the nut, the said bored holes opening if desired, into the interior of the screw thread which they cut up; presenting, in height, a regular or other shape, cylindrical, frustoconical of section decreasing from the face in contact with the member to be gripped, or other suitable shape.

It is also possible to obtain a result which is practically as satisfactory, by making use of the natural elasticity of the metal, without forming any slits in the nut, thus enabling a suitable economy in the cost of production of the lock nut to be obtained.

Moreover, the applicant has also experienced that in certain cases and in particular for gripping parts subjected to considerable vibrations, such for example as the track rails on railways or fishplates, there may be an objection to mounting the elastic locking ring, of the Grower or similar type, preferably, directly in contact with the part to be gripped, on account of the fact that as such rings are split they comprise at the gap, points or teeth which bite into the metal as a result of the vibrations, and may produce an abnormal wear of the member to be gripped, the fishplate, rail or other part.

In order to obviate this disadvantage in such a case, there is interposed between the elastic locking ring of the nut and the member to be gripped a separate member formed, for example by an ordinary flat plate, or a plate of particular outlines, shapes and dimensions or otherwise.

The invention further envisages the cases in which this kind of nut is employed for locking members capable of undergoing contractions and subject to vibrations, as for example, in aeroplanes or in the case of pieces of wood forming plank linings employed in railway rolling stock, and which may be subjected in succession to humidity and a dry heat.

It has been recognized, in fact, that under these conditions the nuts of the kind mentioned may no longer present their usual character of being non-slackening, on account of the fact that when the parts to be gripped (or one at least of them) contract, the split and elastic locking ring, preferably of the Grower type, which is interposed between these parts and the nut, in the groove of which it is normally wedged, may, as it is no longer held by the parts on account of the contraction, and the action for instance, of vibrations, become loosened to a certain extent, and release from all pressure the threads of the nut which it pressed against those of the bolt. It follows that the nuts can then, as a result of vibrations, either become unscrewed, the effect of which will be to produce a definite slackening of the parts, even if they take up again their initial volume, or of becoming screwed further down, the effect of which may be to bend or fracture the parts when their volume increases again to become normal.

With a view to obviating the above mentioned disadvantages the invention in one of its particular forms of constructions effects in all cases a constant locking of the nut upon the thread of the bolt by means of a double wedging of the nut and a counter nut, which wedging is obtained according to the principle set forth above by means of a split and elastic ring with a double wedging surface interposed between the nut and the counter nut and wedged simultaneously in grooves formed in the said nut and counter nut.

These improvements are hereinafter described in detail and diagrammatically illustrated, by way of constructional examples, in the accompanying drawings in which:

Fig. 1 is a plan view of the base or face which comes opposite the member to be gripped of a first modification of the lock nut.

Fig. 2 is a similar view of a second modification.

Fig. 3 is a vertical section through an improved device comprising a ring with a double wedging surface.

Fig. 4 is a front view of a detail of the Grower type ring the profile of which is designed with a view to obtaining a double wedging surface.

Fig. 5 is a vertical section through a modification comprising two locking rings combined with an intermediate double bearing ring with supplementary wedging and capable of being quickly rendered inoperative.

Fig. 6 is a partial top plan view of Fig. 5.

In these figures, 1 is the nut in which is formed an annular groove or recess 2 concentric with the screwthread and the cross section of which may be either triangular, trapezoidal or of any other appropriated cross section.

As shown in Fig. 1, the elasticity of the part 1' of the nut comprised between the groove 2 and the bolt, may be obtained by means of drilled holes 3' of circular section formed over the whole height, or preferably, half way down, forming notches in the thread of the nut 1, these drilled holes being cylindrical or frustoconical.

In the modification shown in Fig. 2 the elasticity of the portion 1' of the nut comprised between the groove 2 and the hole in the nut, is obtained by means of a series of drilled holes 3'' of circular or other suitable section formed in the said portion over the whole height or preferably as far as half way up, starting from the base; these drilled holes 3'' which may according to the case be cylindrical or frusto-conical or otherwise, do not open in the hole in the nut, the screw thread of which is, consequently, not cut up.

It may also be sufficient to leave only a relatively thin wall (half mm. to 1 mm. approximately) between the groove serving as lodgment for the locking ring and the thread of the nut, the natural elasticity of which wall permits the thread of the nut to be gripped effectively upon that of the bolt by the action of the locking ring.

With regard to the device formed by the nut, counter nut, and ring with double wedging surface, more particularly applicable for gripping parts capable of contracting and subjected to vibrations, which device is shown in Figs. 3 and 4, A and A' are the parts to be gripped by means of a bolt 4 and a nut 1. According to the invention the gripping effect of the nut 1 is removed from the effect of the contraction of the parts to be gripped together by definitely fixing its position upon the thread of the bolt 4 and, for this purpose, provision is made of a locking device comprising a counter nut 5 with the interposition between the nut 1 and the counter nut 5 of a locking ring 6 wedged simultaneously in the interior of the groove 7 provided on the upper part of the nut 1, and a groove 8 provided at the lower part of the counter nut 5, the said nut and counter nut being preferably made elastic upon the portion existing between their threads and their grooves in any suitable manner, by slits, drilled holes, or in any other way. In this way the nut 1 is positioned in an absolutely immovable manner upon the thread of the bolt 4 on account of the fact that the locking thus obtained by the ring 6 for the nut 1 and the counter nut 5, is removed from the effect of a possible contraction of the parts A and A'. This ring 6 is preferably, as shown in Fig. 4, a split ring of the Grower type of ring, and has a profile such that it presents two or a larger number of wedging surfaces for cooperating simultaneously with the nut 1 and the counter nut 5.

In order to enable such devices to be dismounted rapidly, and also in order to increase the efficiency of the locking action, provision is made (Figs. 5 and 6) in combination with two simple locking rings 9 having a conical base, of an intermediate double bearing ring 10 comprising conical seatings 11 cooperating with the corresponding base of the rings 9 the effect of which is to increase the wedging action of this ring.

Further, as described above, the intermediate bearing ring 10 split as shown in Fig. 6 comprises extended portions 12 over which is slipped with pressure, a gripping sleeve 13 before the locking of the counter nut 5.

On account of this fact, dismounting is rendered extremely rapid, since it is sufficient to remove the sleeve 13 in order to open the intermediate ring 10 and remove its wedging action upon the rings 4.

It is understood that it is possible, without going outside the scope of the invention, to make modifications and improvements in the details.

What I claim is:

1. In combination a nut having a threaded bore and having in one face thereof a groove with walls inclined one toward the other, said nut having a plurality of cavities in said face to render the portion of the nut lying intermediate the groove and wall of the bore resilient, and a split locking ring of substantially helicoidal form located in said groove, said ring being so shaped as to exert a camming action to force the resilent portion of the nut into gripping engagement with the bolt when the nut is tightened.

2. In combination, companion nuts having threaded bores and grooves in the faces thereof and cavities dividing the wall of the bore into resilient sections, and elastic split locking means engaged in said grooves, said means and grooves having forms such that there is exerted a wedging action on the nuts to lock them upon a bolt, and an intermediate bearing ring disposed between and exerting a wedging action upon the locking means.

3. A lock nut device comprising companion nuts each having a threaded bore and having in one face thereof a groove with walls inclined one toward the other, each nut having a plurality of cavities in its said face to render the portion thereof lying intermediate the groove and wall of the bore resilient, and split means of substantially helicoidal form located in said grooves, said means being shaped as to exert a camming action to force the resilient portions of the nuts into gripping engagement with the bolt upon tightening of the assembly.

4. A lock nut assembly comprising companion nuts each having a threaded bore and having in one face thereof a groove with walls inclined one toward the other, the portion of each nut lying intermediate the groove and wall of the bore being so formed as to be resilent, and split locking means of substantially helicoidal form located in said grooves, the outer diameter of said means varying from substantially that of its inner diameter at the top and bottom to a maximum at or near its middle so as to exert a wedging action on the nuts to lock them upon a bolt.

5. A device according to claim 4 wherein a bearing ring co-operates with said locking means to enhance the gripping engagement of the resilient portions of the nuts with a bolt upon tightening.

6. An assembly according to claim 4, wherein a bearing ring coperates with said locking means to enhance the gripping engagement of the resilent portions of the nuts with a bolt upon tightening and wherein means are provided for locking and unlocking said bearing ring.

7. A nut and bolt assembly comprising a first member adapted to contact with the parts to be secured, a second member, said members being bored and internally screw threaded and the face of one member and that face of the other member which opposes it being both provided with a concentric groove forming sleeve-like portions, each groove having walls inclined one toward the other, and said portions having one or more cavities therein whereby they are rendered resilient, and resilient helicoidal locking means of substantially wedge-shaped cross section disposed between said opposing faces and cooperating with said grooves whereby when one member is tightened upon a bolt with respect to the other member, said sleeve-like portions are forced against the bolt by a radial force exerted by said locking means, and said means also exerts a force longitudinally of the bolt against said members.

In testimony whereof I affix my signature.

AUDOIN d'HALLOY.